United States Patent Office 3,361,540
Patented Jan. 2, 1968

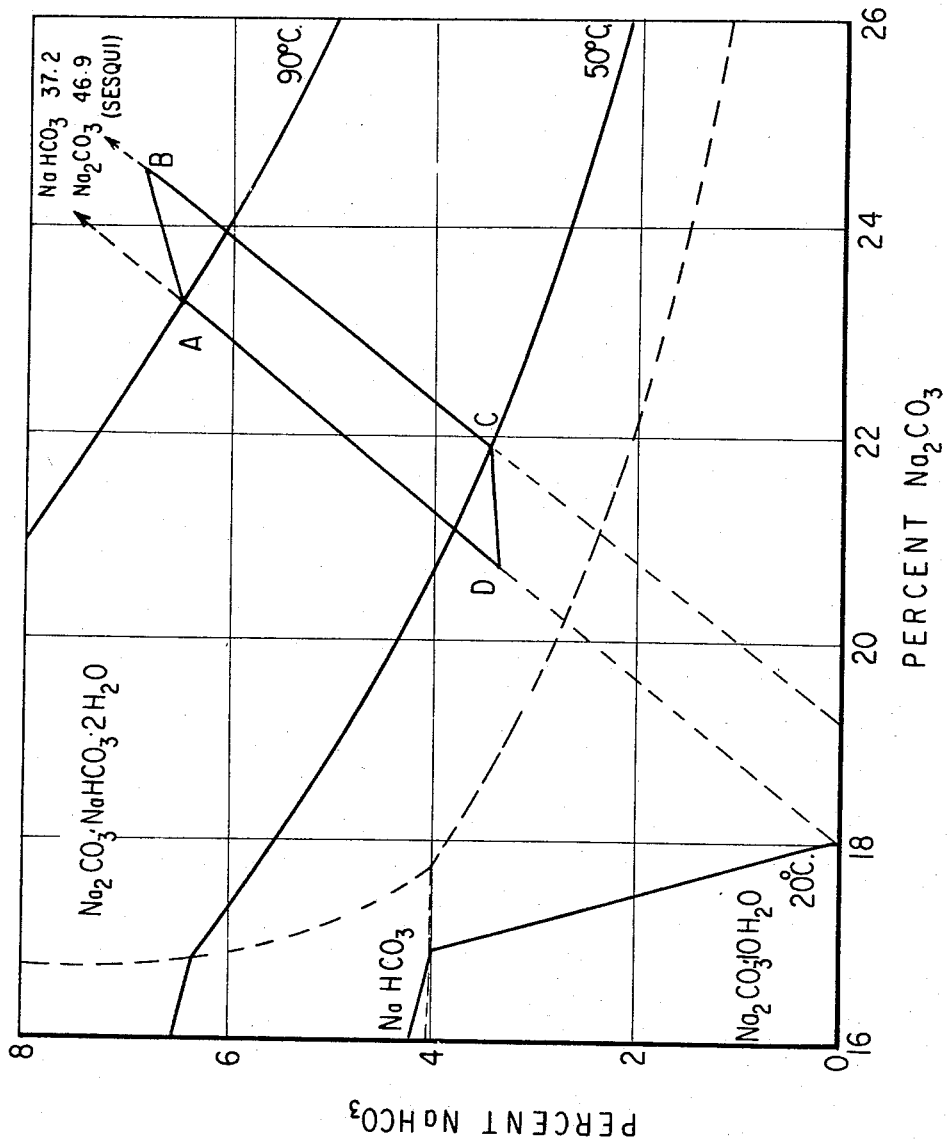

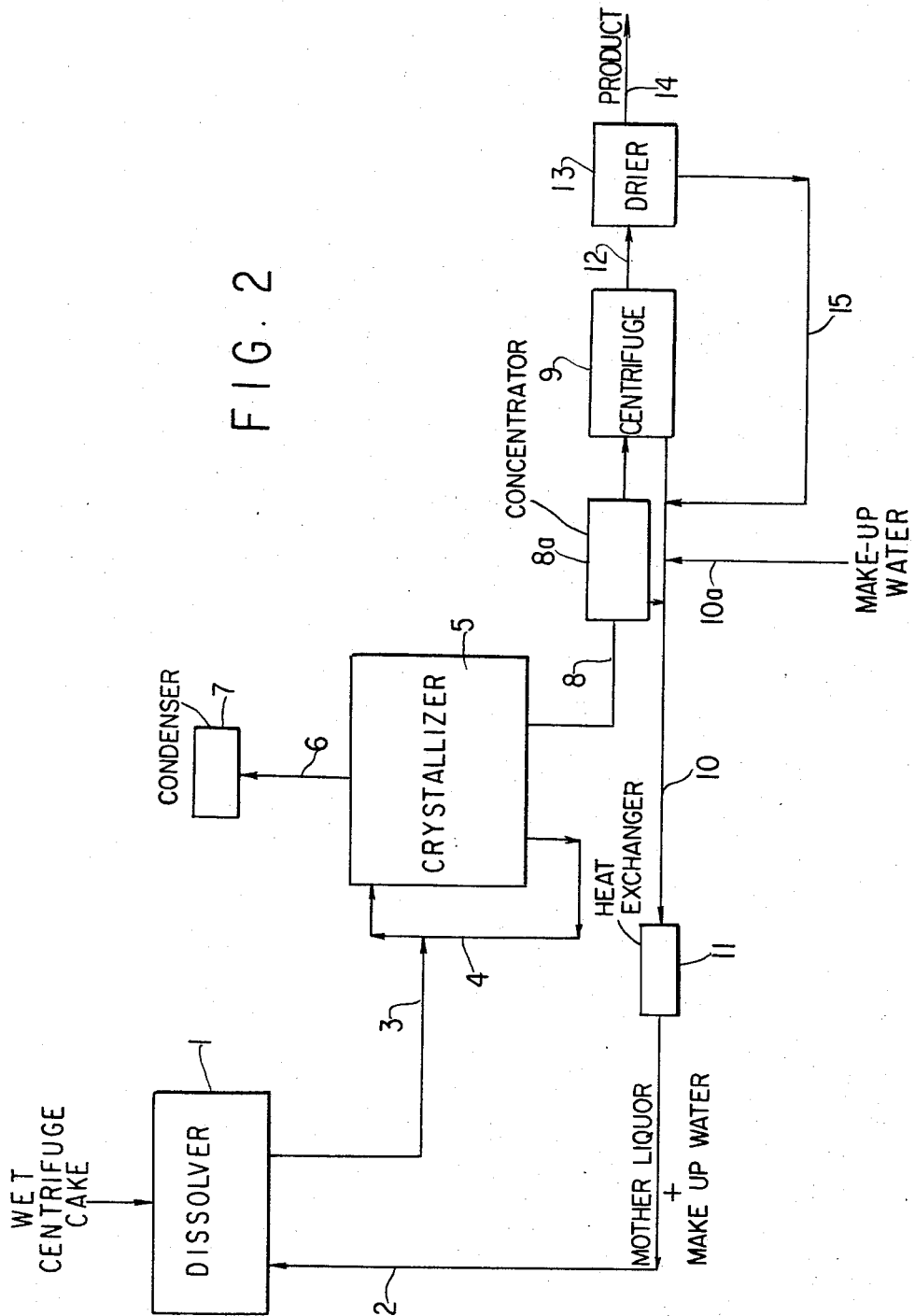

3,361,540
PROCESS FOR PRODUCTION OF SODIUM SESQUICARBONATE
Guy D. Peverley and Richard W. Waggener, Green River, Wyo., assignors, by mesne assignments, to Intermountain Research & Development Corporation, Cheyenne, Wyo., a corporation of Wyoming
Filed June 29, 1965, Ser. No. 468,022
6 Claims. (Cl. 23—302)

ABSTRACT OF THE DISCLOSURE

A process for the production of dry sodium sesquicarbonate crystals suitable for use in dry detergent compositions, having a bulk density of 40 to 50 pounds per cubic foot and a minimum size of 80% +100 mesh from solutions from which sodium sesquicarbonate crystallizes as the only stable phase.

---

A typical source of raw material to form such solutions for the production of the said dry sodium sesquicarbonate is trona from southwestern Wyoming deposits. These trona deposits are usually found at a depth of 1200 to 1800 feet underground and consist of a main trona bed varying in thickness from about 8 to 18 feet and other beds of smaller thickness. The said trona consists mainly of sodium sesquicarbonate ($NaHCO_3 \cdot Na_2CO_3 \cdot 2H_2O$) and 4 to 6% insoluble impurities. A typical analysis of the crude trona is:

| | Percent |
|---|---|
| $Na_2CO_3$ | 45.00 |
| $NaHCO_3$ | 36.00 |
| $H_2O$ | 15.30 |
| NaCl | 0.04 |
| $Na_2SO_4$ | 0.01 |
| Total iron | 0.08 |
| Water insoluble | 3.60 |

The composition of the crude trona corresponds quite closely to that of pure sodium sesquicarbonate except for the impurities present. The trona is associated with shale stringers or beds which alter the amount of impurities in different parts of the bed.

Sodium sesquicarbonate is used in many dry detergents rather than soda ash in order to prevent the pH of solutions of the detergents from becoming too high and too harsh on the hands. In order to be acceptable for use in dry detergents, the sodium sesquicarbonate crystals must be white, contain at least 80% +100 mesh crystals and have a low bulk density of 40 to 50 pounds per cubic foot, preferably 43 to 49 pounds per cubic foot.

It is an object of the invention to provide a novel method for the production of white sodium sesquicarbonate crystals having a bulk density of 40 to 50 pounds per cubic foot and at least 80% +100 mesh crystals.

It is another object of the invention to provide a novel method of preparing sodium sesquicarbonate crystals suitable for use in dry detergents, without crystal salting in the crystallizers which reduces or eliminates shut downs to boil out the crystallizers.

These and other objects and advantages of the invention will become obvious from the following detailed description.

The process of the invention comprises forming an aqueous solution of sodium carbonate and sodium bicarbonate from which sodium sesquicarbonate crystallizes as the only stable crystal, adding the said solution to a crystallization zone in which a crystal slurry of 10 to 30%, preferably about 18%, and an excess carbonate of 10 to 25%, preferably about 18%, are maintained, evaporating water from the said crystal slurry to maintain a constant temperature while circulating a portion of the slurry to control crystal growth, separating mother liquor from the sodium sesquicarbonate having a bulk density of 40 to 50 pounds per cubic foot and at least 80% +100 mesh crystals. The crystallization is preferably effected by cooling the solution in vacuum crystallizers with recirculating circuits as illustrated in Pike Patent No. 2,789,790 but other forms of evaporative crystallizers may be used.

The aqueous solution of sodium carbonate and sodium bicarbonate can be prepared in any suitable fashion. For example, sodium sesquicarbonate centrifuge cake produced in a plant for producing soda ash from crude trona by processes such as illustrated in United States Patent No. 2,789,790 to Pike or United States Patent No. 3,119,655 to Frint et al. may be dissolved in mother liquor. Other ways would be to dissolve crude trona in mother liquor, remove the insolubles from the resulting solution and filter the said solution or to steam strip an aqueous solution of sodium bicarbonate solution to convert sufficient sodium bicarbonate to sodium carbonate so sodium sesquicarbonate will crystallize.

The slurry in the crystallizer must constain between 10 and 30% of crystals, preferably about 18%. If the slurry density is less than 10%, the particle size and the bulk density of the sodium sesquicarbonate decrease so that the dry sodium sesquicarbonate crystals are not acceptable for formulation of dry detergent compositions.

Between 15 and 50%, preferably about 30%, of the crystallizer solution should be circulated per minute through a circulating leg continuously. If the circulation rate is too high, the particle size and bulk density of the sodium sesquicarbonate crystals will increase to undesirable sizes and if the circulation rate is too low, the particle size and bulk density decrease to an undesirable degree and rapid salting occurs in the crystallizer which necessitates stopping their operation and boiling out the accumulated crystals.

The amount of excess carbonate in the crystallizer solution should be kept between 10 and 25%, preferably about 14 to 18%. When the excess carbonate is within the 14 to 18% range the desired crystal particle size and bulk density is obtained and salting of the crystallizer which occurred at lower percentages of excess carbonate is avoided. Excess carbonate is the amount by which the normal carbonate ($Na_2CO_3$) exceeds that contained in trona or sodium sesquicarbonate.

Referring now to the drawings:

FIG. 1 illustrates part of the solubility diagram for the constituents of sodium sesquicarbonate and water.

FIG. 2 is a diagrammatical flow sheet illustrating one embodiment of producing sodium sesquicarbonate crystals by the process of the invention.

In FIG. 1 the solid lines marked 90° C., 50° C. and 20° C. represent the isotherms of solubilities at these temperatures. In the part of the solubility diagram shown in FIG. 1, three solid phases can exist in equilibrium with solutions of sodium carbonate and sodium bicarbonate depending on solution composition and temperature. These solid phases are sodium bicarbonate ($NaHCO_3$), sodium carbonate decahydrate ($Na_2CO_3 \cdot 10H_2O$), and sodium sesquicarbonate or trona ($Na_2CO_3 \cdot NaHCO_3 \cdot 2H_2O$). The region where sodium sesquicarbonate is the equilibrium solid phase is the only one of interest in this process.

The process of the invention may be described by reference to FIG. 1. Feed liquor of composition A is prepared. The temperature of this solution is maintained above 90° C. to avoid precipitation prior to feeding this solution into the crystallizer. In an evaporative cooling crystallizer, water is evaporated while cooling the remaining solution to a lower temperature. The cooling and evaporating reduce the solubility of sodium sesquicarbonate which crystallizes or precipitates from the solution. The system composition after evaporation of water is indicated by point B. This is an unstable (non-equilibrium) composition and the system separates into two phases, crystalline sodium sesquicarbonate and mother liquor of composition C. Line BC represents this crystallization. After separating the crystals from the mother liquor, make-up water is added to the mother liquor to prepare a solution of composition D. Sodium sesquicarbonate or trona is dissolved in heated solution D to give feed liquor of composition A. Line DA represents this dissolving of sodium sesquicarbonate.

Lines DA and BC which represent the dissolving and crystallizing of sodium sesquicarbonate are called "excess carbonate" lines. Compositions along these lines represent varying amounts of sodium sesquicarbonate dissolved in a sodium carbonate-water solution. The percent sodium carbonate in this solution is the "excess carbonate." For example compositions along dissolving line DA may be represented by varying amounts of sodium sesquicarbonate dissolved in an 18% sodium carbonate solution. In the same manner the crystallizing line BC is along the 19.2% "excess carbonate" line.

In the embodiment of FIG. 2, wet sodium sesquicarbonate centrifuge cake produced from crude trona by the process of United States Patent No. 3,119,655 or any other plant by adjusting this feed liquor to the proper composition by adding sodium carbonate. In this case, the mother liquor from the crystallization step would be returned to the major plant stream.

If detergent quality sodium sesquicarbonate were being made in an ammonia soda plant, the crystallizer feed liquor could be prepared by wet calcining a sodium bicarbonate slurry to the proper sodium carbonate and sodium bicarbonate values for crystallizer feed. The mother liquor could be returned to preferably the wet calciner, although it could be returned to other alkali containing streams in the plant. In all of these cases the crystallizing conditions are controlled as described.

In the following example a preferred embodiment is described to illustrate the invention. However it should be understood that the invention is not intended to be limited to the specific embodiment.

*Example*

In accordance with the process described in FIG. 2 wet centrifuge cake was processed continuously to produce 9900 pounds per hour of dry sodium sesquicarbonate crystals suitable for use in dry detergents. This is approximately 40,000 tons per year. The material balance throughout the system is set forth in Table I.

TABLE I

|  | Composition, percent | | | Pounds Per Hour | | | |
| --- | --- | --- | --- | --- | --- | --- | --- |
|  | $NaHCO_3$ | $NaCO_3$ | $H_2O$ | $NaHCO_3$ | $NaCO_3$ | $H_2O$ | Total |
| Wet centrifuge cake to dissolver 1 | 35.3 | 44.5 | 20.2 | 3,815 | 4,810 | 2,175 | 10,800 |
| Mother Liquor recycle through lines 10 and 2 make-up water | 4.0 | 21.3 | 74.7 | 4,665 | 24,640 | 86,495 | 115,800 |
| Crystallizer feed-line 3 | 6.7 | 23.3 | 70.0 | 8,450 | 29,350 | 88,200 | 126,000 |
| Water vapor condensed in 7 |  |  | 100 |  |  | 8,640 | 8,400 |
| Concentrator feed slurry | 8.0 | 25.2 | 66.8 | 7,495 | 23,615 | 62,790 | 93,900 |
| Centrifuge feed | 14.8 | 30.2 | 55.0 | 4,985 | 10,160 | 18,455 | 33,600 |
| Crystal discharge from centrifuge | 34.9 | 44.0 | 21.1 | 4,090 | 5,155 | 2,455 | 11,700 |
| Make-up water |  |  | 100 |  |  | 5,100 | 5,100 | suitable process is added to dissolver 1 wherein it is dissolved in recycled mother liquor from line 2 having a temperature of about 98° C. to produce a solution of sodium carbonate and sodium bicarbonate having excess carbonate of 10 to 25% saturated at 91° C. The said aqueous solution is then passed by line 3 to circulating leg 4 and then into crystallizer 5 wherein a crystal slurry of 10 to 30% is maintained. To provide cooling, water is evaporated by vacuum in crystallizer 5, and removed by line 6 to condenser 7, if desired. The slurry of sodium sesquicarbonate crystals in mother liquor is removed from the said crystallizer. An intermediate crystal concentrator 8a is used between the crystallizer 5 and the centrifuge 9, and the mother liquor is added to the recycled mother liquor. The mother liquor is returned by line 10 and passed through heat exchanger 11 to reheat the mother liquor and make-up water added by line 10a before being recycled by line 2 to dissolver 1. The sodium sesquicarbonate crystals which may contain up to 10% mother liquor are passed from centrifuge 9 by line 12 to a concurrent flow drier 13 and the dried sodium sesquicarbonate product is removed by line 14. Dust from the drier is added by line 15 to the mother liquor recycle. If desired, the product may be screened to increase the percentage of +100 mesh crystals and the undersize portion can be added to the mother liquor recycle stream 10.

While the above describes a continuous process where the mother liquor which is separated from the product sesquicarbonate is recycled to the dissolvers, it is recognized that other alternates are possible without departing from the spirit of the invention. For example, if the detergent quality sesquicarbonate is being made in a major plant which produces soda ash via a sodium sesquicarbonate intermediate, the intermediate sesquicarbonate be dissolved in a cycling mother liquor as described. It would also be possible to utilize the major plant crystallizer feed liquor for feed to the detergent quality sesquicarbonate Various modifications of the invention may be made without departing from the spirit or scope thereof and it is to be understood that the invention is intended to be limited only as defined in the appended claims.

What is claimed is:

1. A process for the preparation of white sodium sesquicarbonate crystals having a bulk density of 40 to 50 pounds per cubic foot and at least 80% +100 mesh crystals which comprises forming an aqueous solution of sodium carbonate and sodium bicarbonate from which sodium sesquicarbonate crystallizes as the only stable crystal, adding the said solution to a crystallization zone in which a crystal slurry of 10 to 30%, and 10 to 25% of an excess of carbonate, are maintained, evaporating water from the said crystal slurry while recirculating 15 to 50% of the slurry to control crystal growth, separating mother liquor from the sodium sesquicarbonate crystals and drying the crystals to obtain white sodium sesquicarbonate having a bulk density of 40 to 50 pounds per cubic foot and at least 80% +100 mesh crystals.

2. The process of claim 1 wherein the crystal slurry in the crystallization zone contains about 18% crystals.

3. The process of claim 1 wherein the excess carbonate in the crystallization zone is about 14 to 18%.

4. A process for the preparation of white sodium sesquicarbonate crystals having a bulk density of 40 to 50 pounds per cubic foot and at least 80% +100 mesh crystals which comprises dissolving sodium sesquicarbonate in recycled mother liquor to form an aqueous solution from which sodium sesquicarbonate crystalizes as the only stable crystal, adding the said solution to a crystallization zone in which a crystal slurry of 10 to 30% and excess carbonate of 10 to 25% are maintained, evaporating water from the said crystal slurry while recirculating a portion of the slurry to control crystal growth separating mother liquor from the sodium sesquicarbonate crystals, recycling the mother liquor to the dissolving step and drying the said crystals to obtain white sodium sesquicarbonate crystals having a bulk density of 40 to 50 pounds per cubic foot and at least 80% +100 mesh crystals.

5. A process for the preparation of white sodium sesquicarbonate crystals having a bulk density of 40 to 50 pounds per cubic foot and at least 80% +100 mesh crystals which comprises dissolving sodium sesquicarbonate in recycled mother liquor to form an aqueous solution from which sodium sesquicarbonate crystalizes as the only stable crystal, adding the said solution to a crystallization zone in which a crystal slurry of 10 to 30% and excess carbonate of 10 to 25% are maintained, evaporating water from the said crystal slurry while recirculating 15% to 50% of the slurry to control crystal growth, separating mother liquor from the sodium sesquicarbonate crystals, recycling the mother liquor to the disdissolving step and drying the said crystals to obtain white sodium sesquicarbonate crystals having a bulk density of 40 to 50 pounds per cubic foot and at least 80% +100 mesh crystals.

6. The process of claim 5 wherein 30% of the crystal slurry is recirculated.

References Cited

UNITED STATES PATENTS

| | | | |
|---|---|---|---|
| 1,911,794 | 5/1933 | Britton | 23—302 |
| 2,780,520 | 2/1957 | Pike | 23—302 |
| 2,792,282 | 5/1957 | Pike | 23—302 |
| 3,119,655 | 1/1964 | Frint | 23—63 |
| 3,131,996 | 5/1964 | Seglin | 23—63 |
| 3,233,983 | 2/1966 | Bauer | 23—302 |
| 3,748,182 | 4/1966 | Herink | 23—302 |
| 3,259,471 | 7/1966 | Cortessis | 23—302 |

NORMAN YUDKOFF, *Primary Examiner.*

G. P. HINES, *Assistant Examiner.*